Dec. 20, 1966     P. T. MATTIMOE ETAL     3,293,343
METHOD FOR MAKING GLARE-REDUCING LAMINATED GLAZING UNITS
Filed May 20, 1963     2 Sheets-Sheet 1

INVENTORS
Paul T. Mattimoe and
BY Harry E. Conner
Nobbe & Swope
ATTORNEYS

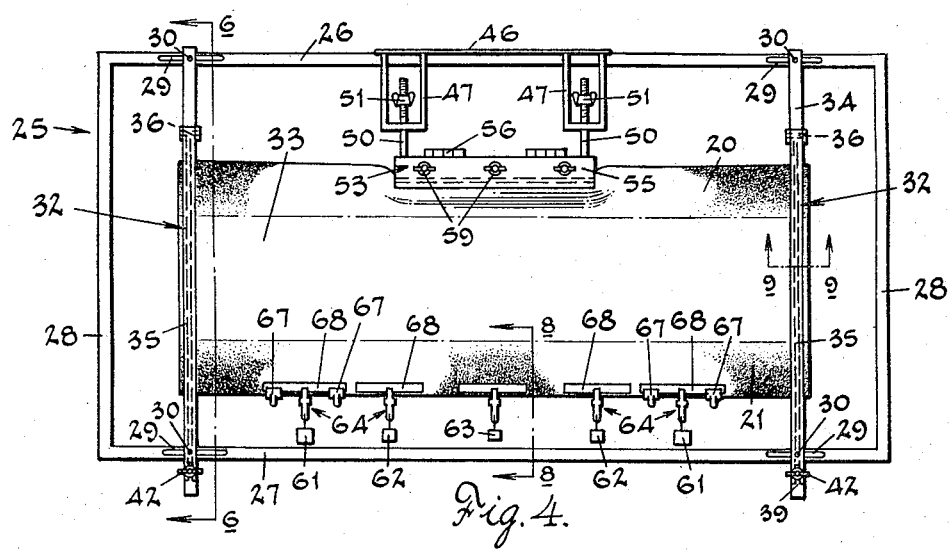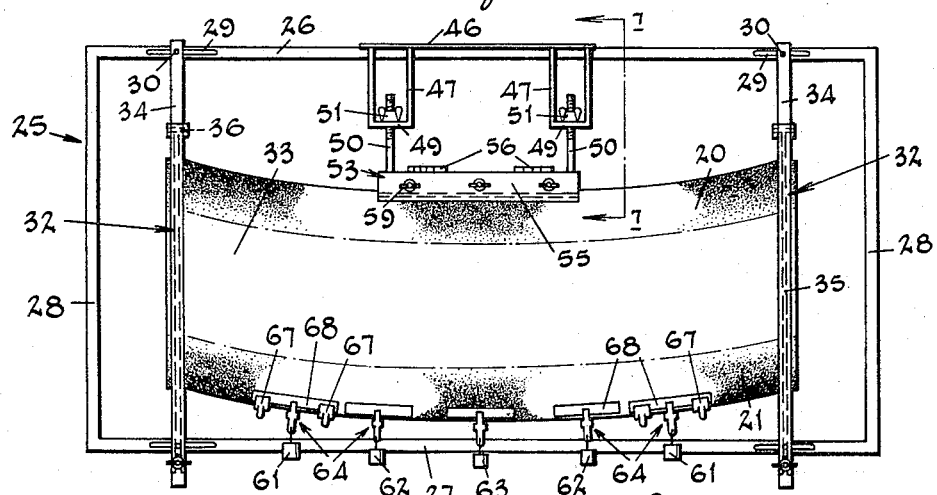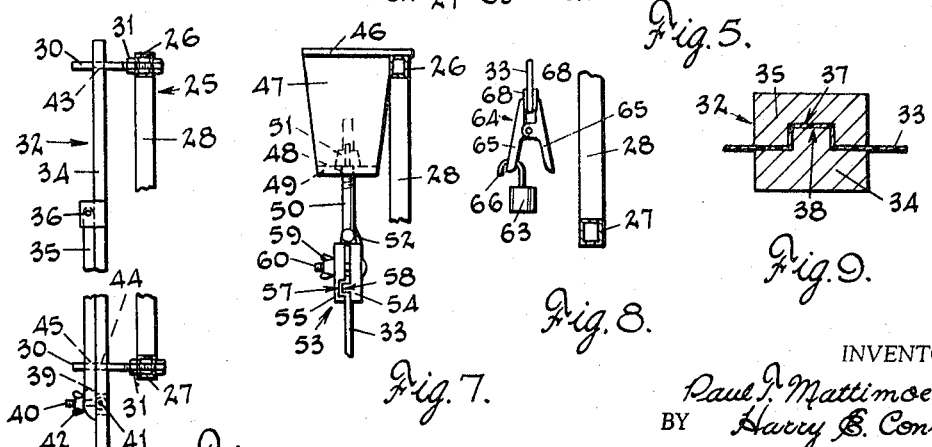

United States Patent Office 3,293,343
Patented Dec. 20, 1966

3,293,343
METHOD FOR MAKING GLARE-REDUCING
LAMINATED GLAZING UNITS
Paul T. Mattimoe and Harry E. Conner, Toledo, Ohio, assignors to Libbey-Owens-Ford Glass Company, Toledo, Ohio, a corporation of Ohio
Filed May 20, 1963, Ser. No. 281,466
6 Claims. (Cl. 264—291)

This invention relates generally to the production of glare-reducing windows or the like, and more particularly is concerned with making a novel, curved, laminated vehicle glazing closure or windshield including two spaced glare-reducing bands, one adjacent the upper marginal edge portion of the windshield and one adjacent the lower marginal edge portion of the windshield.

Glare-reducing laminated windshields employed in present-day automobiles in general utilize a plastic interlayer having a colored or neutral shaded band extending across the upper marginal edge portion thereof. This band is preferably graduated with the greatest concentration of light-absorbing dye being present nearest the periphery of the plastic interlayer and the concentration thereof diminishing gradually toward the other edge of the band until finally becoming almost imperceptible at the fade-off line. It has been found that this band greatly reduces the discomfort to the driver and other occupants of the automobile which normally results from direct sun glare through a windshield.

Because the windshield in present automobile production models is mounted in a tilted or non-vertical fashion, and also because of the longitudinal curvature of the windshield, a laminated glass assembly constructed with a thermoplastic interlayer having a rectilinear colored band when the interlayer is flat possesses a fade-off line between the dyed band and the undyed portion that is non-horizontal in appearance. Accordingly, it has been necessary to distort or warp the interlayer prior to lamination to derive a fade-off line which is horizontal and substantially parallel to the horizon when the windshield is installed in its functional position in the automobile.

Now, while these windshields including an interlayer having one dyed band along the upper marginal edge portion thereof have been found effective to greatly reduce glare as compared to conventional windshields in which such a band is not present, it has been found that objectional glare can be still further reduced and a greatly improved windshield provided by incorporating a second colored or neutral shaded band along the lower marginal edge portion of the interlayer and windshield. Thus, it has been discovered that the provision of this second band tends to eliminate highly objectionable glare resulting from reflections from the hood of the automobile and from the road surface itself.

Further, it has been found that the apparatus and methods currently employed for stretching or warping a thermoplastic interlayer having only an upper glare-reducing band are not satisfactory to produce an acceptable interlayer having two spaced glare-reducing bands incorporated therein. More specifically, it has been found that the use of such apparatus and methods results in undue sagging or overwarping, particularly of the central portion of the upper band when attempting to derive the proper curvature in the lower band, which in turn results in the pair of bands not being parallel to each other and also not being horizontal when windshields incorporating the interlayers are installed in their functional position in an automobile windshield opening. This, of course, is highly undesirable.

It is therefore a principal object of the present invention to provide a novel glare-reducing glazing closure, e.g. an automobile windshield, including two spaced glare-reducing bands, one of which is adjacent the upper marginal edge of the closure and the other adjacent the lower marginal edge thereof.

Another object of the invention is the provision of a glare-reducing glazing closure of the above type wherein the inner edges or fade-off lines of the bands are substantially parallel to each other and to the horizon when the closure is mounted in an automobile and is viewed from the interior thereof.

It is a futher object of the invention to provide a method for producing a thermoplastic interlayer including two spaced, substantially parallel, curved glare-reducing bands adjacent the upper and lower marginal portions thereof.

Other objects and advantages of the invention will become more apparent during the course of the following description when taken in connection with the accompanying drawings.

In the drawings, wherein like numerals are employed to designate like parts throughout the same:

FIG. 4 is a front elevational view of the apparatus in accordance with the invention and showing a thermoplastic sheet assembler therein prior to the warping or shaping step of the method of the invention;

FIG. 5 is an elevational view similar to FIG. 4 showing the apparatus and the thermoplastic sheet after the latter has been warped;

FIG. 6 is a broken, vertical section taken along the line 6—6 of FIG. 4;

FIG. 7 is an enlarged, vertical section taken along the line 7—7 of FIG. 5;

FIG. 8 is an enlarged, vertical section taken along the line 8—8 of FIG. 4; and

FIG. 9 is an enlarged, horizontal section taken along the line 9—9 of FIG. 4.

Figure 1:
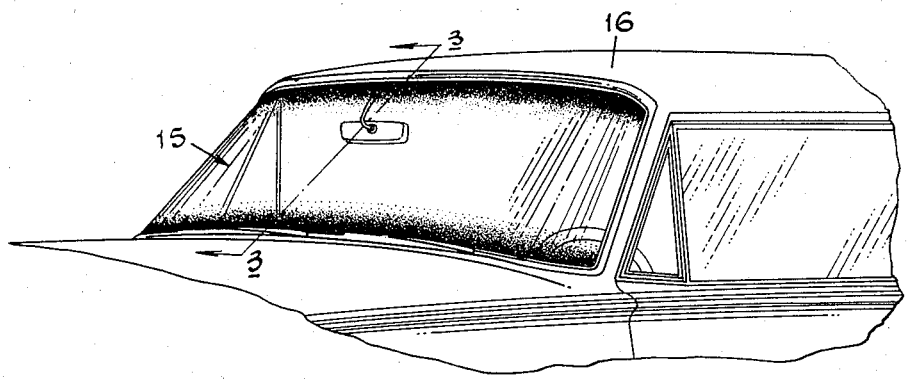
FIG. 1 is a perspective view of the windshield in accordance with the invention shown in its functional position as installed in the windshield opening of an automobile.

Briefly stated, the present invention contemplates a method of shaping or preforming a generally rectangular thermoplastic sheet having a pair of spaced, rectilinear, colored or neutral shaded glare-reducing bands extending along and parallel to the upper and lower longitudinal edges thereof in order to enable its use in a curved, laminated glass unit. Such method includes initially supporting the sheet preferably in a substantially vertical plane with the longitudinal edges thereof disposed generally horizontally by engaging both transverse edges of the sheet. In addition, the upper longitudinal edge of the sheet is engaged centrally thereof, but without such engagement in any way aiding in initially supporting the sheet. With the sheet supported in the above manner, a plurality of tractive forces are applied to the lower longitudinal edge of the sheet at spaced points therealong in a direction perpendicular to such lower edge and in the plane of the sheet. The sheet is then heated to an elevated temperature at which the tractive forces become effective to deflect or distort the sheet by causing it to sag downwardly between the engaged transverse edges thereof which in turn results in the longitudinal edges and the glare-reducing bands adjacent thereto to become curved with respect to the horizontal.

Now, during this portion of the heating cycle, the upper central portion of the sheet, although engaged, is free to sag. However, after a predetermined amount of drop or sag of the sheet as a whole, i.e. intermediate the engaged edges thereof, further drop of the upper central portion thereof is arrested without, however, discontinuing the application of the tractive forces to the lower edge of the sheet. These forces are continued to be applied until the sheet assumes its final desired shape or, more particularly, until the fade-off lines of the two glare-reducing bands are to all intents and purposes parallel, i.e. equidistant from each other throughout their lengths. The sheets are then cooled, while supported in the above manner and maintained in the deflected condition, to a lower temperature, for example, room temperature, whereat the tractive forces are no longer necessary and the sheet will remain set in the desired curved condition.

In addition, the present invention contemplates using a novel apparatus for shaping or preforming a generally rectangular thermoplastic sheet for use in a curved laminated glazing unit and, more particularly, for carrying out the method above described. Briefly stated, this apparatus includes a rigid, substantially rectangular frame composed of a pair of opposed end members and a pair of opposed, longitudinally extending side members. Slots are provided in both side members adjacent either end thereof to receive bolts which in turn are adapted to receive the ends of a pair of clamping members for mounting same on the frame, preferably in a substantially vertical position and spaced apart a distance slightly less than the longitudinal dimension of the plastic sheet. Means are associated with each of the clamping members for engaging the transverse edges of the sheet to support the later, also preferably in a generally vertical plane. In addition, means are provided, associated with the upper of the frame side members, for engaging the sheet along the central portion of the upwardly positioned peripheral edge thereof. These latter means, while engaging the sheet as described, do not act to support the sheet initially but become effective to arrest the downward deflection or sag of the sheet and support same after a predetermined amount of such downward deflection has been effected. In this respect, in order to cause this downward deflection, a plurality of weights or other means are provided to apply tractive forces to the lower edge of the sheet in a direction perpendicular to such edge and in the plane of the sheet.

While the foregoing brief description of the method of the invention has been directed to the treatment of only one plastic sheet at a time, it should be understood that a plurality of sheets may be treated simultaneously by the present method and using the apparatus of this invention without in any manner departing from the scope of the invention.

Referring now more particularly to the drawings, there is illustrated in FIG. 1 a windshield 15 produced in accordance with this invention as it appears from the outside of the automobile 16 in which the windshield is mounted. The windshield 15 is of a conventional laminated construction in that it comprises two sheets of glass 17 and 18 and a non-brittle thermoplastic interlayer 19, e.g. composed of a plasticized polyvinyl butyral resin, all bonded together to form an integral structure. However, it departs from the conventional construction by having the plastic interlayer 19 thereof provided with two glare-reducing areas or bands 20 and 21 located along the top and bottom marginal edge portions thereof which are of a colored or neutral shade and graduated in intensity from a relatively dark at the top and bottom peripheries of the interlayer to practical extinction at the inner edges of the bands ending in almost imperceptible fade-off lines 22 and 23 between the colored or neutral and uncolored or clear medial glass viewing area 24. In this respect, both bands may be of a neutral shade, both may be colored, or one of the bands may be neutral and one colored.

As previously mentioned, the purpose of these bands is to provide within the windshield, areas which are effective to eliminate or at least greatly reduce objectionable direct glare from the sun or indirect glare therefrom as resulting from reflections from the hood of the automobile and the road surface.

Figure 2:
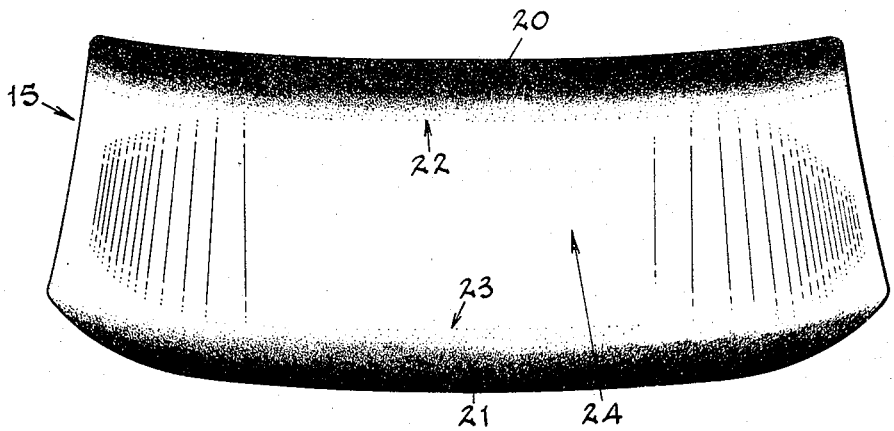
FIG. 2 is a front elevational view of the windshield.
Figure 3:
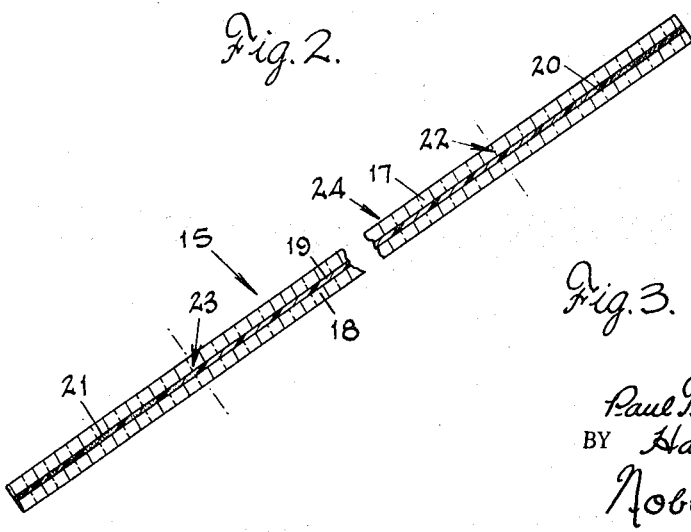
FIG. 3 is a broken, vertical section view taken along the line 3—3 of FIG. 1.

Now, when viewed from the inside of the automobile 16, the fade-off lines 22 and 23 appear as substantially straight, parallel, horizontal lines across essentially the entire width of the windshield. However, if the windshield 15 were actually positioned in a vertical plane, this would not be the case as can be readily seen with reference to the elevational view of the windshield prior to installation (FIG. 2). Thus, both the top and bottom glare-reducing bands 20 and 21 are actually curved at their fade-off lines 22 and 23, it having been found, as previously mentioned, that bands with straight, horizontally arranged fade-off lines will not appear as such when employed in laminated structures or windshields having a principal curvature about the transverse axis and installed or mounted at an angle to the vertical. Accordingly, it is necessary to warp or stretch the interlayers provided with rectilinear glare-reducing bands so that they assume the desired curved shape prior to lamination thereof.

As shown in FIGS. 4 to 9, the apparatus in accordance with the invention for distorting an interlayer such as shown at 19 comprises a fixed rectangular frame indicated generally at 25 having top and bottom, longitudinally extending side rails 26 and 27, respectively, and end rails 28. The top and bottom rails 26 and 27 are formed with a pair of slots 29 therein adjacent each end of the rails for the purpose of receiving bolts 30 (FIG. 6), the bolts being placed in substantially right angle relationship with the slots 29 and being slidably adjustable within the limits of the latter. The bolts 30 are threaded adjacent the headed ends thereof to receive nuts 31 which are tightened against the frame members 26 and 27 to hold the bolts 30 fixed at a preselected position longitudinally of the slots and thus provide the desired distance between a pair of clamping members, indicated generally at 32, which are used to support the end portions of one or more plastic sheets 33 to be shaped into interlayers as will be hereinafter more fully described. As mentioned, the pairs of opposed bolts 30 are slidably adjustable in the slots 29. It will be appreciated, therefore, that interlayer groups of different sizes may be handled by merely adjusting the bolts to the necessary spacing for receiving thereon the clamping members 32 which in turn receive opposite ends of the plastic sheets.

Each clamping member 32 comprises an elongated body portion 34 and a clamping bar 35 hinged thereto as at 36 adjacent the upper end of the body portion for pivotal movement away from such body portion as illustrated by the dotted line position of the bar in FIG. 6. The clamping bar 35 is provided with a longitudinal mid-groove 37 positioned to receive a rib 38 formed on the adjacent surface of the body portion 34 (FIG. 9) and an open-ended slot 39 which is adapted to be entered by a bolt 40 pivoted to the body portion adjacent its lower end as at 41 and which is provided with a wing nut 42 to lock the clamping bar 35 to the body portion 34 and thus tautly fix the plastic sheet or sheets 33 therebetween.

The body portion 34 is also provided with a pair of openings 43 and 44 adjacent the upper and lower ends thereof respectively, which have diameters slightly larger than that of the bolts 30, and another opening 45 of the same size as openings 43 and 44 extends through the clamping bar 35 and is concentric therewith when the bar is in contact with the body portion. The openings 43, 44 and 45 are adapted to receive the bolts 30 when the latter are secured at the desired position in the longitudinal slots 29 in the frame members 26 and 27 to thus position and hold the clamping members 32 and plastic sheet 33 clamped thereon, preferably in a vertical position, on the frame 25.

A plate 46 is welded to the top of the upper frame member 26 centrally thereof to extend forwardly of the frame. A pair of spaced, generally U-shaped brackets or hanger members 47 are affixed to the plate 46 adjacent either end thereof and extend downwardly from the plate and frame member 26. Apertures 48 are provided in the web portions 49 of the members 47 and are adapted to receive rods 50 for vertical sliding movement therein. The rods 50 are threaded at their upper ends to receive wing nuts 51 thereon. The lower ends of the rods 50 are secured at 52 to a clamping member 53 formed by two slats 54 and 55 joined together at their upper surfaces by means of hinges 56. The slats may include a mating groove and rib 57 and 58 respectively, at the lower ends thereof for gripping the central portion of the upper peripheral edge of the plastic sheet 33 in essentially the same vertical plane as the members 32 when wing nuts 59 are tightened on bolts 60 extending through aligned openings in the slats.

As previously indicated, in order to produce a thermoplastic interlayer of the required shape in accordance with the invention, tractive forces must be applied to the edge of the rectangular sheet opposite that engaged by the clamping member 53. In this respect, while there are several ways to apply such forces, e.g. by levers, springs, etc., it is preferred to employ a series of weights 61, 62 and 63 which are freely movable within or adjacent the frame 25. More specifically, spring clamps, indicated generally at 64 (FIG. 8), may be attached to the lower edge of the thermoplastic sheet 33 and such clamps may have holes formed in one or both legs 65 thereof to receive therethrough hooks 66 protruding from the weights 61, 62, and 63. Also, in the event the weights themselves possess sufficient mass to overcome the spring compression of the clamps 64, additional small pinch clamps such as illustrated at 67 may be affixed adjacent the ends of the slats 68 of each clamp 64.

To utilize the apparatus of this invention, and in accordance with the method thereof, the clamping members 32 are placed in recesses in a set-up table (not shown), which recesses are parallel to each other and spaced apart a distance slightly less than the longitudinal dimension of the plastic sheet or sheets 33 to be shaped or distorted. With the clamping members 32 thus positioned, the clamping bars 35 thereof are pivoted upwardly away from the body portions 34 and one or more plastic sheets having a pair of spaced, rectilinear colored or neutral shaded bands extending inwardly from their longitudinal edges are placed on the table with the transverse edges of the sheets projecting slightly beyond the body portion 34 of the clamping members. The clamping bars 35 are then lowered and the pivoted bolt 40 swung into the slot 39 in the bar. Tightening the wing nuts 42 then locks the clamping bars 35 to the body portions 34 with the sheets becoming gripped securely therebetween.

The clamping members 32 are next removed from the set-up table recesses and positioned on the frame 25 by aligning the apertures 43 in the upper ends of the body portions 34 with the upper pair of bolts 30, passing the latter through the apertures and then aligning and passing the lower pair of bolts 30 through the apertures 44 and 45 in the lower ends of the body portions and clamping bars. In this connection, the bolts 30 have previously been adjusted longitudinally in the slots 29 to accommodate the particular size of sheets 33 and, more particularly, such that the sheets are held taut between the clamping members in a substantially vertical plane. The frame 25 may be conveniently located in a heating chamber or furnace during this loading operation.

The clamping member 53 is next attached to the upper edge of the sheet or sheets 33 centrally thereof by pivoting the slats 54 and 55 away from each other about the hinges 56 and inserting such upper central peripheral portion therebetween so that the edge extends slightly beyond the groove and rib 57 and 58 formed in the slats. The slats 54 and 55 are then swung together and the bolts 60 inserted through the slats to receive the wing nuts 59 which are tightened to secure the sheet or sheets 33 to the clamping member.

Immediately after securing the clamping member 53 to the plastic sheets, the nuts 51 are positioned on the rods 50 a uniform, predetermined distance upwardly from the webs 49 of the bracket members 47. This distance of the nuts 51 from the webs 49 is fixed by the amount of "drop" previously calculated to be necessary prior to arresting the downward deflection of at least the upper central portion of the sheet 33 in order to derive substantially the proper curvature in the glare-reducing bands. In this respect, it will be appreciated that the clamping member 53 will be resting on the central portion of the upper edge of the sheet or sheets 33 when initially positioned on the frame 25 prior to shaping thereof whereby the weight of the member will cause a certain amount of sag in the adjacent portions of the sheet as indicated in FIG. 4. However, the weight of the member 53 is kept very small so as to cause as little sag of the upper central portion as possible.

With the sheets positioned on the frame, the weights 61, 62 and 63 are secured to the lower marginal edges thereof in order to apply a predetermined downwardly directed tractive force thereon. In this respect, the weights are chosen such that their masses exert the forces necessary completely along the lower edges of the sheets to derive the desired curvature of the interlayer and the glare-reducing bands. In the particular embodiment illustrated, the central weight 63 is of less mass than the intermediate weights 62 which are in turn of less mass than the weights 61. As mentioned, however, this of course will vary in accordance with the interlayer shape desired to fit the specific windshield curvature in which it is to be laminated.

After the weights are affixed to the lower sheet edges as illustrated in FIG. 4, the heating chamber in which the frame 25 is positioned is brought up to a temperature in the range of approximately 150° to 250° F. The action of the heat on the plastic, together with the tractive forces applied by the weights, causes the plastic sheets to be deflected downwardly intermediate the clamping members 32 until such deflection is at least partially arrested by the engagement of the wing nuts 51 with the webs 49 of the bracket members 47. Upon engagement of these nuts with the webs, however, the weights 61, 62 and 63 are still permitted to continue to impose tractive forces on the lower edges of the sheets for a predetermined, relatively short time. This has been found necessary in order to derive the desired curvature in the lower glare-reducing band without concurrently producing an overwarp in the upper glare-reducing band and particularly in the central portion thereof. Then, when the sheets assume their final desired shape or, more particularly, when the fade-off lines 22 and 23 of the two glare-reducing bands 20 and 21 are to all intents and purposes parallel, i.e. equidistant from each other throughout their lengths, the sheets are cooled to room temperature, being maintained however during this cooling period in the deflected condition illustrated in FIG. 5. The sheets are then removed from the frame 25 and the final windshield interlayer cut therefrom.

In accordance with a specific embodiment of the invention and, more particularly, with regard to the shaping of an interlayer for use in a windshield of the type employed in 1963 model automobiles, a plasticized polyvinyl butyral resin sheet 64 inches long and 27½ inches wide is provided. The polyvinyl butyral sheet includes two 6-inch glare-reducing bands extending along and parallel to both longitudinal edges of the sheet. After clamping the transverse ends of the sheet in the members 32 spaced 62 inches from each other on a lay-up table, five clamps 64 are attached to the lower edge of the sheet. In this respect, the two outermost clamps have 10-inch slate 68 and are positioned such that their centers are located 13 inches inwardly from the ends of the sheet while the two clamps immediately adjacent thereto have 8-inch slats and are positioned such that their centers are 23 inches from the transverse edges of the sheet. The center clamp also has an 8-inch slat and is spaced medial of the other two 8-inch clamps or 9 inches therefrom.

The clamping members and sheet are then taken from the lay-up table and positioned on the frame 25 located just outside a heating chamber. In this respect, the clamping members are located approximately 70 inches from each other on the frame whereby the sheet is stretched slightly when such members are mounted so as to be held taut therebetween, the amount of stretch, however, only being sufficient to overcome the tendency of the sheet to sag due to its own weight. Thus, the sheet is located substantially in a plane when initially positioned in the furnace.

The clamping member 53 is next attached to the upper peripheral edge of the sheet, such member being 24 inches in length and affixed centrally of the transverse edges of the sheet. The nuts 51 are then threaded on the bolts 50 so as to be located 3½ inches above the webs 49 of the bracket members 47 with the clamping member resting upon the upper edge of the sheet.

Weights 62 are attached to the clamps 64 with the center weight being 1 pound, the two intermediate weights being 1¼ pounds, and the outer weights being 1¾ pounds. The temperature of the heating chamber is then raised to 180° F. and the frame and attached sheet wheeled therein and maintained in the chamber for 7.5 minutes. The heat is then cut off, the heating chamber doors opened, and the temperature of the chamber allowed to drop to room temperature, i.e. approximately 74° F. The sheet is thereafter removed from the frame and clamping members 32. Inspection of the sheet and positioning same on a dummy windshield containing markings to indicate the desired location of the interlayer fade-off lines showed that the glare-reducing bands are substantially equidistant from each other throughout the entire length of the sheet and possessed the curvature necessary such that upon lamination thereof to produce the above mentioned 1963 windshield and mounting of the latter in an automotive body, the bands would appear horizontal and substantially parallel with the horizon.

It will, of course, be appreciated that the specific temperatures and heating times employed in the novel method, as well as the mass of the weights used to obtain the desired tractive forces and the distance of "drop" of the upper center clamp before it becomes effective to support the interlayer at the upper central portion thereof, will vary according to the particular shape of the laminated unit in which the sheet is to be incorporated. Further, while it is preferred that the thermoplastic sheets be mounted in a vertical plane during the shaping operation, this is not to be considered a limitative feature of the invention. Thus, the sheet or sheets may be shaped while mounted in other than vertical planes although a different method of applying the tractive forces might have to be utilized in such an embodiment, e.g. springs, levers, etc., since reliance upon gravity would not be possible.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:
1. A method of preforming a generally rectangular thermoplastic interlayer for use in a curved laminated glass unit, said plastic interlayer having spaced rectilinear glare-reducing bands extending along and parallel to a first pair of opposite edges thereof, comprising supporting said interlayer substantially in a plane by engaging a second pair of opposite edges, applying tractive forces to one edge of said first pair of opposite edges in a direction perpendicular to said edge and in the plane of the interlayer, heating said interlayer while applying said tractive forces to cause said interlayer including said first pair of opposite edges thereof to be deflected intermediate said second pair of engaged edges in the direction of said forces and said first pair of edges to become curved, and arresting the deflection of a portion of the other of said first pair of opposite edges centrally thereof while continuing to apply said tractive forces to said one edge of said first pair.

2. A method of preforming a generally rectangular thermoplastic interlayer for use in a curved laminated glass unit, said plastic interlayer having spaced glare-reducing bands extending along and parallel to the longitudinal edges thereof, comprising supporting said interlayer in a substantially vertical plane such that said longitudinal edges are disposed generally horizontally by engaging the transverse edges thereof, applying tractive forces to the lower longitudinal edge of the interlayer in a direction perpendicular to said lower edge and in the plane of the interlayer, heating said interlayer while applying said tractive forces to cause said interlayer including the upper central portion thereof to be deflected downwardly intermediate said engaged transverse edges thereof and said longitudinal edges to become curved with respect to the horizontal, and arresting the deflection of the upper central portion of the interlayer while continuing to apply said tractive forces to said lower edge.

3. A method of preforming a generally rectangular thermoplastic interlayer as claimed in claim 2, wherein said interlayer is positioned in a heating chamber during said heating operation and said chamber is maintained at a temperature in the range of approximately 150° to 250° F.

4. A method of preforming a generally rectangular thermoplastic interlayer as claimed in claim 2, wherein said interlayer is cooled while said tractive forces are continued to be applied to said lower edge.

5. A method of preforming a generally rectangular thermoplastic interlayer as claimed in claim 2, wherein said tractive forces are applied at spaced points across said lower longitudinal edge of the interlayer.

6. A method of preforming a generally rectangular thermoplastic interlayer as claimed in claim 5, wherein said tractive forces vary in magnitude from approximately the center of the interlayer outwardly thereof to either end of the lower longitudinal edge.

References Cited by the Examiner
UNITED STATES PATENTS

| | | | |
|---|---|---|---|
| 2,451,794 | 10/1948 | Balsam et al. | 18—19 |
| 2,593,525 | 4/1952 | Beckham | 296—84 |
| 2,817,117 | 12/1957 | Shields et al. | |
| 2,885,732 | 5/1959 | Kazmaier et al. | 264—291 |
| 2,892,217 | 6/1959 | Loboshez | 18—56 |
| 2,924,485 | 2/1960 | Miles | 296—84 |
| 2,934,790 | 5/1960 | Shwayder | 18—56 |
| 2,968,064 | 1/1961 | Howell | 18—19 |

ROBERT F. WHITE, *Primary Examiner.*

A. HARRY LEVY, ALEXANDER H. BRODMERKEL,
*Examiners.*

J. A. PEKAR, M. R. DOWLING, *Assistant Examiners.*